United States Patent Office 3,515,832
Patented June 2, 1970

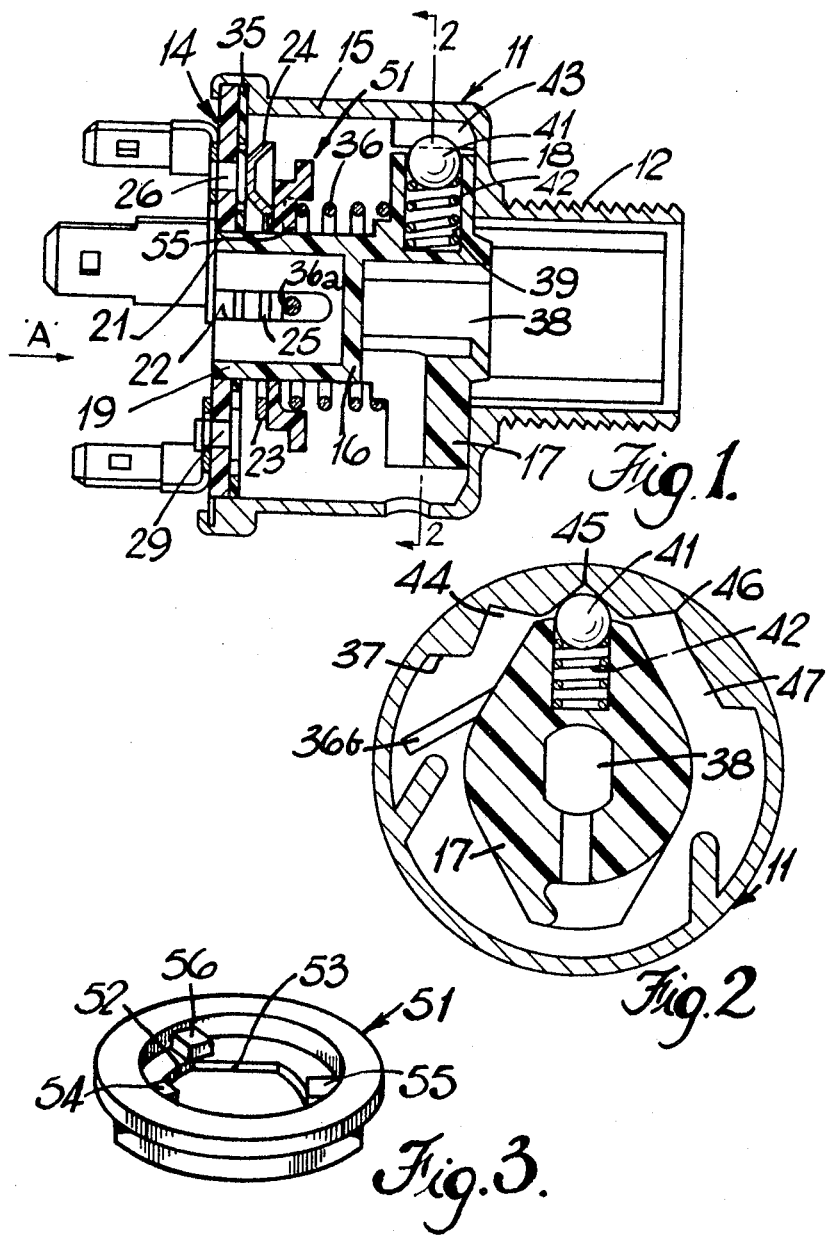

3,515,832
THRUST WASHERS FOR USE WITH HELICALLY WOUND SPRINGS AND IMPROVED IGNITION SWITCHES UTILISING SUCH THRUST WASHERS
Rex Martin, Blackburn, England, assignor to Joseph Lucas (Industries) Limited, Birmingham, England
Filed May 8, 1968, Ser. No. 727,580
Claims priority, application Great Britain, May 26, 1967, 24,609/67
Int. Cl. H01h 27/06
U.S. Cl. 200—166                    4 Claims

ABSTRACT OF THE DISCLOSURE

An improved thrust washer, for use with a helical spring, comprises a body having a peripheral stiffening flange which defines a recess in the body. One end of the helical spring with which the washer is used is engaged in said recess, and upstanding from the base of the recess are three angularly spaced projections. The three projections lie on the circumference of an imaginary circle having its centre on the axis of the spring in use, so that the major segment defined by any two projections contains the third projection. The heights of the projections are such that when the imaginary circle containing the projections lies in a plane at right angles to the axis of the spring then the free ends of the projections lie substantially in the helical path of the end convolution of the spring presented to the body. An improved ignition switch includes the improved washer between the movable contact plate of the switch and the contact pressure spring.

---

This invention relates to thrust washers for use with helical springs where the helical spring is used to apply a compressional load and a torsional load to a member which is capable of axial and angular movement.

Helical springs are normally wound in such a manner that their end convolutions do not extend along the same helical path as the intermediate convolutions of the spring. The end convolutions in fact normally extend towards their respectively adjacent convolution at such an angle that the free ends of the end convolutions of the spring touch the respective adjacent convolution of the spring.

Where the free ends of such a spring are clamped to respective parts movable angularly and axially relative on one another, and the spring is used to apply a compression load and a torsional load to one of the parts it is found that the compression load applied to the part varies around the end convolution of the spring and so there is a tendency for the part to be tilted with respect to the axis of the spring.

It is an object of the present invention to provide a thrust washer which will minimise this tendency.

A thrust washer according to the invention comprises a body, and three projections extending from the body and which engage the end convolution of a helical spring in use, said projections lying on the circumference of an imaginary circle having its centre on the axis of the spring so that the major segment defined by any two projections contains the third projection, the projections being so dimensioned that when said imaginary circle lies in a plane at right angles to the axis of the spring then the free ends of the projections will lie substantially in the helical path of said end convolution of the spring.

In the accompanying drawings,

FIG. 1 is a sectional side view of an ignition switch using a thrust washer according to one example of the invention, FIG. 2 is a sectional view on the line 2—2 in FIG. 1, and FIG. 3 is a perspective view of the thrust washer.

Referring to the drawings, there is provided a cylindrical casing 11 which is stepped to provide a shoulder 18 and is closed at its wider end by a contact board 14. Rotatable within the narrower cylindrical part 12 of the casing 11 is the core (not shown) of a cylinder lock, the part 12 of the casing 11 constituting the barrel of the lock. Within the wider part 15 of the casing 11 is a rotor 16, rotatably supported at one end in the contact board 14 and secured at its other end to the core of the lock for rotation therewith.

The rotor 16 is moulded in a synthetic resin material and is formed with a head 17 of substantially elliptical configuration (FIG. 2). The head 17 abuts against the shoulder 18 of the casing 11, and extending axially from the head is a hollow substantially cylindrical shank 19, formed with a pair of diametrically opposite longitudinally extending flats (not shown) and a longitudinally extending slot 22 the end of the shank 19 being rotatably supported in a hole 21 formed in the contact board 14.

Surrounding the shank 19 is an annular contact plate 23 provided with projections 24, the hole in the plate 23 being shaped to define flats engaging flats on the shank 19 so that the plate 23 rotates therewith.

Associated with the board 14 are four contacts, two of which are shown at 26 and 29, and each of which incorporates one or more terminal blades positioned externally of the plate 14 for connection to external circuits, and a contact portion on the interior of the plate, the contact portions extending into holes in an insulating plate 35 over which the projections 24 move.

The contact plate 23 is urged towards the contact board 14 by a spring 36 acting through the intermediary of a thrust washer 51 (to be described). One free end 36a of the spring is engaged in the slot 22 in the shank 19, and the other free end 36b of the spring extends towards the inner wall of the casing 11.

The rotor 16 is provided with an axially extending bore 38 of noncircular cross section with which is engaged a complementarily shaped spigot which extends from the core of the cylinder lock. By virtue of this engagement the rotor 16 is rotatable with the core of the lock. In the head 17 is a radial bore 39 containing a ball 41 which is urged by a spring 42 into engagement with an arcuate cam track 43 on the casing 11.

The cam track 43 comprises three angularly spaced depressions 44, 45, 46. When the switch is in its off position the ball 41 is engaged with the depression 45 of the cam track 43 and the projections 24 of the contact plate 23 engage with the insulating member 35.

If it is required to energise the auxiliary circuit of the vehicle an ignition key is inserted into the core of the cylinder lock and rotated in a counterclockwise direction. Since the core of the lock, the rotor 16 and the contact plate 23 are not rotatable relatively to one another, angular movement of the key results in angular movement of the plate 23 with respect to the contacts on the contact board 14. By turning the key in a counterclockwise direction the plate 23 is moved to a position in which it completes the auxiliary circuit. When the plate 23 is in this position the ball 41 engages the depression 44 which prevents accidental rotation of the key and consequently the plate 23. By virtue of the engagement of the end 36a of the spring 36 with the slot 22 in the shank 19, the spring 36 is rotated with the shank 19.

To complete the ignition circuit of the vehicle the key is turned in a clockwise direction, whereupon the ball 41 engages the depression 46 and the plate 23 completes the ignition and auxiliary circiuts. The end 36b of the spring 36 now engages a lug 37 formed as part of the cam track 43. To energise the starter motor of the vehicle the key is rotated further in a clockwise direction which forces the ball 41 to ride up the ramp 47 and causes the contact plate 23 to bridge the input and starter contacts while maining the bridge between the input and ignition contacts. However since the end 36b of the spring 36 is engaged with the lug 37, such further rotation of the key in a clockwise direction causes the spring to be twisted, so that if the key is now released the spring 36, now acting as a torsion spring, will return the switch to its first position in which the ball 41 engages the depression 46 and the ignition circuit is still completed but the starter motor circuit is broken.

The part 12 of the casing 11 is externally screw threaded to facilitate mounting of the switch on the dashboard or bulkhead of a road vehicle.

Turning now to FIG. 3, the thrust washer 51 comprises an annular dished synthetic resin member, the central hole 52 of which is provided with a pair of diametrically opposite flats 53 which engage the flats on the shank 19. Integral with the base of the washer 51 and on the inner surface thereof are three projections 54, 55, 56 which are arranged on the circumference of an imaginary circle having its centre on the axis of revolution of the washer 51. It will be appreciated that in order to support the spring 36 so that it is stable the projections 54, 55, 56 must be arranged so that the major segment of the imaginary circle defined by any two of the projections contains the third projection. The projections 54, 55, 56 are of different heights and are so dimensioned that their uppermost ends lie on a helix having the same diameter and helix angle as the last convolution of the helical spring with which the washer is to be utilized.

The spring 36 is a conventional helical compression spring the free ends of the end convolutions of which are bent out of the helical path of the remainder of the spring so that they can be restrained to hold the spring against angular movement when the spring is used as a torsion spring. In such conventional helical springs the end convolutions of the spring extend at a smaller helix angle than do the intermediate convolutions of the spring so that the planes of the ends of the spring are disposed as closely as possible at right angles to the longitudinal axis of the spring, and part of each of the end convolutions of the spring adjacent the free ends of the end convolutions, engages the respective adjacent convolution of the spring. Thus when the spring is compressed and subject to a torsional load, the axial force exerted by the spring varies from a maximum at the point on the end convolution of the spring which is engaged with its respective adjacent convolution, to a minimum at a point on the end convolution diametrically opposite that point, and so the plate 23 is subject to a tilting moment. However, since the end convolution of the spring adjacent the plate 23 is located in the washer 51 and engages the projections 54, 55, 56, the uppermost ends of which conform substantially to the same helix as the convolution of the spring with which they are engaged, then by positioning the spring angularly with respect to the projections 54, 55, 56 so that it extends at right angles to the washer 51, the compressional load applied at the projections 54, 55, 56 will be substantially equal and there will be substantially no tilting moment produced. However, since the end convolution of the spring touches the adjacent convolution at one point, then the load applied at this point will be slightly larger than that which would be calculated from the helix angle of the last convolution of the spring. To overcome this anomaly the highest projection 56 is made slightly higher than its height calculated from the helix angle of the end convolution of the spring, and the spring is positioned with respect to the washer 51 so that the projection 56 engages the end convolution of the spring at a point diametrically opposite said point at which the end convolution engages the adjacent convolution so that the spring is pre-loaded at this point to compensate for the increase in applied load at said point of engagement between the convolutions.

In a modification instead of the one free end of the spring being engaged with the spigot of the rotor, the washer is provided between the projections 54, 55 with a groove in which the free end of the spring engages.

Having thus described my invention what I claim as new and desire to secure by Letters Patent is:

1. An improved thrust washer, for use with a helical spring comprises,
   a body,
   an integral peripheral flange upstanding from the body, and defining in the body a recess having a base, and,
   three angularly spaced projections integral with the body and upstanding from said base within said recess, said projections lying on the circumference of an imaginary circle having its centre on the axis of the spring with which the washer is associated in use, so that a major segment of said imaginary circle defined by any two projections contains the third projection, the projections so dimensioned that when said imaginary circle defined by the projections lies in a plane at right angles to the axis of the spring with which the washer is utilised, then the free ends of the projections will lie substantially in the helical path of the end convolution of the spring presented to the washer.

2. An improved thrust washer as claimed in claim 1 in which the projection which in use will engage the spring at a point diametrically opposite the point at which the end convolution of the spring engages the adjacent convolution of the spring is of greater axial length than would be calculated from the helix angle of the end convolution of the spring, so as to compensate for the contact between the end convolution of the spring and the adjacent convolution of the spring.

3. An electrical switch comprising in combination,
   a rotor,
   a contact plate,
   means coupling the contact plate to the rotor so that the contact plate is driven by the rotor,
   a helical spring urging the contact plate in an axial direction, said spring serving further to resist angular movement of the contact plate beyond a predetermined angular position, and
   a thrust washer as claimed in claim 1, the thrust washer being interposed between the spring and the contact plate, and the washer being rotatable with the contact plate.

4. An electrical switch as claimed in claim 3 in which the washer has the form specified in claim 2 and compensates for the reduced spacing between the end convolution and the adjacent convolution of the spring at one point.

References Cited

UNITED STATES PATENTS

| | | | |
|---|---|---|---|
| 3,270,151 | 8/1966 | Godette | 200—44 |
| 3,339,036 | 8/1967 | Canaday | 200—44 |
| 3,358,093 | 12/1967 | Cryer | 200—44 |
| 3,359,383 | 12/1967 | Cryer. | |

HERMAN O. JONES, Primary Examiner

U.S. Cl. X.R.

200—44; 85—50